United States Patent
Ohkoshi et al.

(10) Patent No.: US 10,099,941 B2
(45) Date of Patent: Oct. 16, 2018

(54) MAGNETIC IRON OXIDE NANOPOWDER AND PROCESS FOR PRODUCING THE SAME

(71) Applicants: THE UNIVERSITY OF TOKYO, Tokyo (JP); DOWA ELECTRONICS MATERIALS CO., LTD., Tokyo (JP)

(72) Inventors: Shin-ichi Ohkoshi, Tokyo (JP); Marie Yoshikiyo, Tokyo (JP); Asuka Namai, Tokyo (JP); Hiroko Tokoro, Tokyo (JP); Waka Tarora, Tokyo (JP); Tomomichi Nasu, Tokyo (JP); Takayuki Yoshida, Tokyo (JP); Manabu Tanaka, Tokyo (JP)

(73) Assignees: THE UNIVERSITY OF TOKYO, Tokyo (JP); DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 15/318,783

(22) PCT Filed: Jun. 18, 2015

(86) PCT No.: PCT/JP2015/067669
§ 371 (c)(1),
(2) Date: Dec. 14, 2016

(87) PCT Pub. No.: WO2015/194650
PCT Pub. Date: Dec. 23, 2015

(65) Prior Publication Data
US 2017/0137302 A1    May 18, 2017

(30) Foreign Application Priority Data

Jun. 18, 2014  (JP) .................................. 2014-124948
Mar. 25, 2015  (JP) .................................. 2015-062084

(51) Int. Cl.
*C01G 49/06* (2006.01)
*H01F 1/11* (2006.01)

(52) U.S. Cl.
CPC ............... *C01G 49/06* (2013.01); *H01F 1/11* (2013.01); *C01P 2002/72* (2013.01);
(Continued)

(58) Field of Classification Search
CPC ........ C01G 49/06; H01F 1/11; C01P 2002/77; C01P 2002/72; C01P 2006/42; C01P 2002/90
See application file for complete search history.

(56) References Cited

U.S. PATENT DOCUMENTS

2012/0276438 A1    11/2012    Saka et al.

FOREIGN PATENT DOCUMENTS

| JP | H10-27705 A | 1/1998 |
| JP | 2007-269548 A | 10/2007 |

(Continued)

OTHER PUBLICATIONS

Bykova, Elena, et al. "Novel high pressure monoclinic Fe2O3 polymorph revealed by single-crystal synchrotron X-ray diffraction studies." High Pressure Research 33.3 (2013): 534-545.*

(Continued)

*Primary Examiner* — Richard M Rump
(74) *Attorney, Agent, or Firm* — Oliff PLC (57) ABSTRACT

A magnetic σ-form iron oxide nanopowder is a novel magnetic iron oxide nanopowder having magnetic polarization and spontaneous electric polarization and having physical properties similar to those of half-metals; and a process produces the magnetic nanopowder. The magnetic powder has a composition represented by $Fe_2O_3$ and has a crystal structure belonging to the monoclinic system.

9 Claims, 13 Drawing Sheets

(52) U.S. Cl.
CPC ...... *C01P 2002/77* (2013.01); *C01P 2002/90* (2013.01); *C01P 2006/42* (2013.01)

(56) References Cited

FOREIGN PATENT DOCUMENTS

| | | |
|---|---|---|
| JP | 2008-063199 A | 3/2008 |
| JP | 2008-174405 A | 7/2008 |
| JP | 2010-018473 A | 1/2010 |

OTHER PUBLICATIONS

Sep. 1, 2015 International Search Report issued in International Patent Application No. PCT/JP2015/067669.

\* cited by examiner

RHOMBOHEDERAL CRYSTAL $R\bar{3}c$

FIG. 13

CUBIC  $Fd\bar{3}m$

MAGNETIC IRON OXIDE NANOPOWDER AND PROCESS FOR PRODUCING THE SAME

TECHNICAL FIELD

The present invention relates to a novel magnetic iron oxide nanopowder (referred to as "σ-form iron oxide", "magnetic σ-form iron oxide nanopowder", and "σ-$Fe_2O_3$" in some cases in the present invention), and a method for producing the same.

DESCRIPTION OF RELATED ART

Inventors of the present invention obtains ε-$Fe_2O_3$ phase, by a chemical nanoparticle synthesis method using a reverse micelle method and a sol-gel method. It is found that the obtained ε-$Fe_2O_3$ phase exhibits a huge coercive force of 20 kOe ($1.59 \times 10^6$ A/m) at a room temperature, and it is also found that this ε-$Fe_2O_3$ phase has an enormous magnetic anisotropy.

The inventors of the present invention also discloses a magnetic powder having a metal-substituted ε-$M_xFe_{(2-x)}O_3$ phase as patent document 1, and discloses a magnetic material composed of ε-$Ga_xFe_{2-x}O_3$ crystal in which a part of a $Fe^{3+}$ ion site of the ε-$Fe_2O_3$ crystal is substituted by $Ga^{3+}$ ion, as patent document 2.

PRIOR ART DOCUMENT

Patent Document

Patent document 1: Japanese Patent Laid Open Publication No. 2008-174405
Patent document 2: Japanese Patent Laid Open Publication No. 2007-269548

SUMMARY OF THE INVENTION

Problem to be Solved by the Invention

In recent years, the development of a material with physical properties such as magnetic polarization and spontaneous electric polarization and properties similar to those of half-metals, is desired in a market, from a viewpoint of energy-saving recording, and from a viewpoint of a development of high-performance magnets.

As described above, the inventors of the present invention have studied on a technique of producing magnetic ε-form iron oxide nanopowder (ε-$Fe_2O_3$), and disclose it by a variety of presentations and applications (for example, see patent documents 1 and 2).

Then, after further research to show that the magnetic ε-form iron oxide nanopowder has a shape with a large aspect ratio, the inventors of the present invention obtains a knowledge regarding the magnetic σ-form iron oxide nanopowder as a novel magnetic iron oxide nanopowder having properties such as magnetic polarization and spontaneous electric polarization and properties similar to those of half-metals.

Under the abovementioned circumstance, the present invention is provided and an object of the present invention is to provide the magnetic σ-form iron oxide nanopowder as a novel magnetic iron oxide nanopowder with physical properties such as magnetic polarization and spontaneous electric polarization and properties similar to those of half-metals, and a method of producing the same.

Means for Solving the Problem

In order to solve the above-described problems, strenuous efforts are made by the inventors of the present invention. As a result, it is found that magnetic σ-form iron oxide nanopowder is generated when magnetic iron oxide nanopowder having ε-$Fe_2O_3$ phase of a single phase is generated by using β-FeO(OH) (iron oxide hydroxide (III)) nanoparticles as a starting material, and covering the β-FeO(OH) nanoparticles by silicon oxide, and thereafter applying heat treatment thereto in an oxidizing atmosphere.

Here, the inventors of the present invention observe XRD of the generated magnetic σ-form iron oxide nanopowder, and analyze a crystal structure and a property of the magnetic σ-form iron oxide nanopowder by performing a Rietveld analysis and the first-principles calculation.

Namely, according to a first aspect of the invention, there is provided a magnetic powder whose composition is $Fe_2O_3$, and whose crystal structure belongs to a monoclinic system.

According to a second aspect of the present invention, there is provided a magnetic powder whose composition is $Fe_2O_3$, and whose crystal structure belongs to a simple lattice (P) of a monoclinic system.

According to a third aspect of the present invention, there is provided a magnetic powder whose composition is $Fe_2O_3$, and having a Fe coordination site of a pentacoordinated structure in a crystal structure.

According to a fourth aspect of the present invention, there is provided a magnetic powder whose composition is $Fe_2O_3$, and having a magnetic polarization and a spontaneous electric polarization at a room temperature wherein an angle formed by the magnetic polarization with respect to the spontaneous electric polarization takes a value between 0° and 90°.

According to a fifth aspect of the present invention, there is provided a magnetic powder whose composition is $Fe_2O_3$, wherein only circularly polarized excitation of one side of right and left circularly polarized excitations can be enabled in a near infrared region from a visible region.

According to a sixth aspect of the present invention, there is provided a magnetic powder whose composition is $Fe_2O_3$, wherein an energy difference between right and left circularly polarized lights is 0.5 eV or more, and a lower energy value of the right and left circularly polarized energies is 1.5 eV or less.

According to a seventh aspect of the present invention, there is provided the magnetic powder of any one of the first to sixth aspects, which is used for producing a composite magnet or a core-shell magnet.

According to an eighth aspect of the present invention, there is provided a method for producing a magnetic powder, to obtain magnetic σ-form iron oxide nanopowder by using β-FeO(OH) (iron oxide hydroxide (III)) nano-particle dispersion, and by covering the β-FeO(OH) nano-particle with silicon oxide, and thereafter applying heat treatment in an oxidizing atmosphere, and applying centrifugation thereto, and drying and evaporating a supernatant liquid.

Advantage of the Invention

The novel magnetic σ-form iron oxide nanopowder of the present invention is considered to have an electronic structure similar to that of a half-metal, and considered to exhibit a performance as the half-metal.

DETAILED DESCRIPTION OF THE INVENTION (Magnetic σ-Form Iron Oxide Nanopowder)

Explanation will be given for magnetic σ-form iron oxide nanopowder of the present invention having a new structure.

Figure 2:
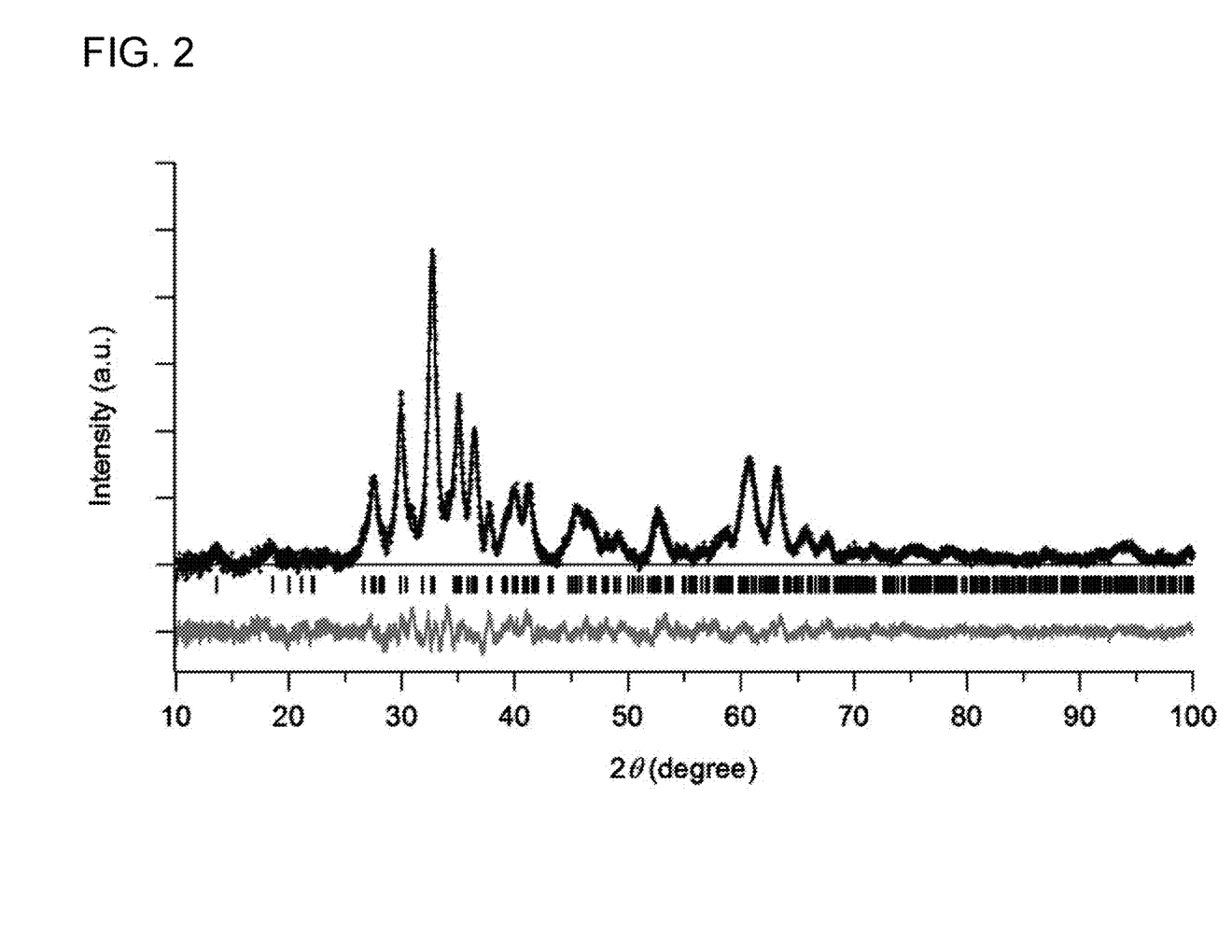
FIG. 2 is a graph showing an XRD pattern and a Rietveld analysis of the magnetic σ-form iron oxide nanopowder.

FIG. 2 is a conceptual view showing an XRD pattern and a Rietveld analysis of the magnetic σ-form iron oxide nanopowder, in which black dots indicate an actually measured XRD intensity. When carrying out calculation using the crystal structure of the σ-form iron oxide, the XRD intensity is calculated as shown by a black solid line, and there is almost no difference from an actually measured value, and it is confirmed that this is $Fe_2O_3$ having a monoclinic crystal structure as described later (gray solid line indicates a residual difference between the actually measured value and the calculated value of the XRD intensity.). Black bar indicates Bragg peak positions of the magnetic σ-form iron oxide nanopowder.

Figure 3:
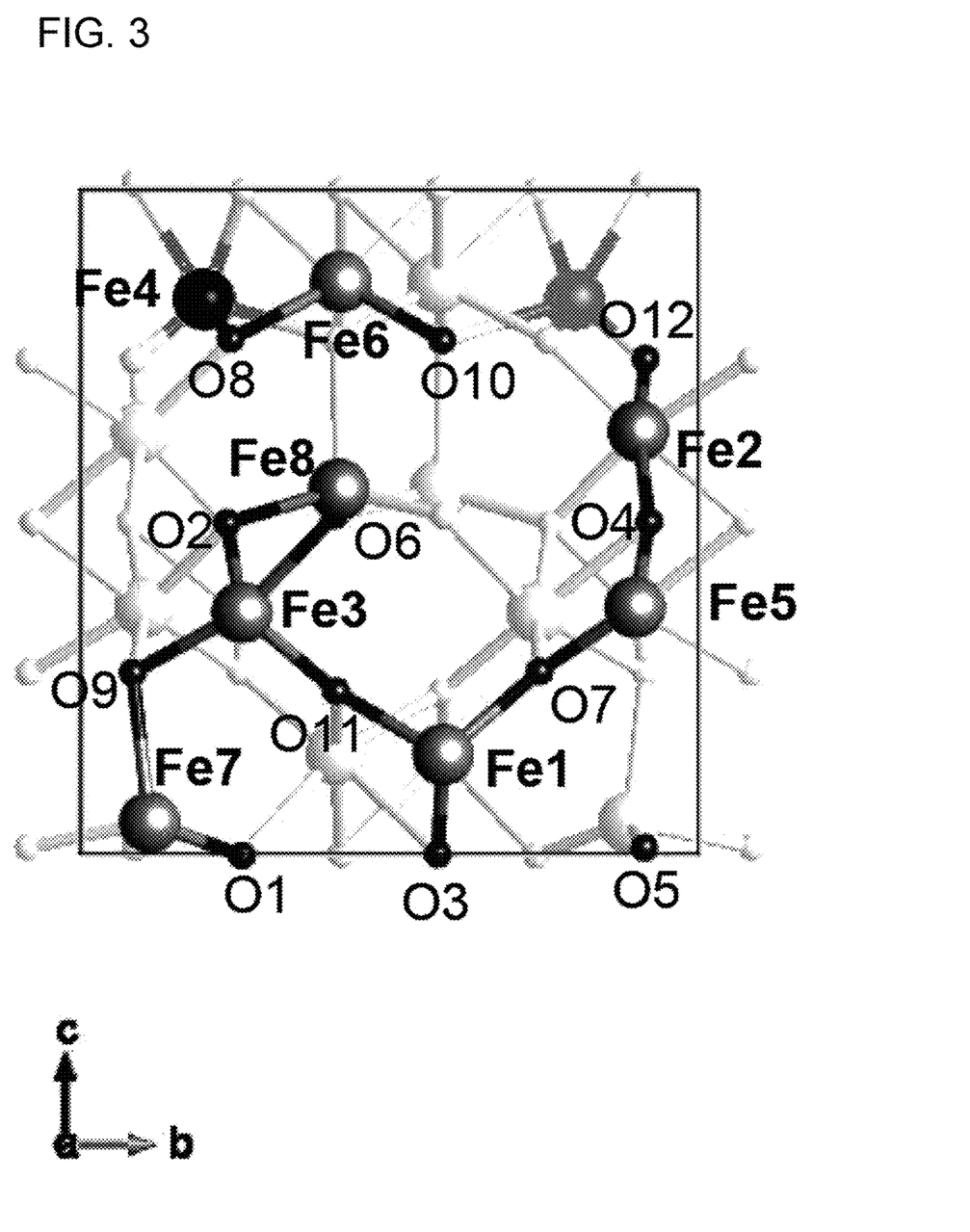
FIG. 3 is an a-axis projection view of a crystal structure of σ-form iron oxide.

FIG. 3 shows an a-axis projection view of the crystal structure of the σ-form iron oxide obtained by the above-mentioned Rietveld analysis.

The σ-form iron oxide shown in FIG. 3 has the crystal structure of a monoclinic system belonging to a simple lattice (P), and a space group of a structure obtained by the Rietveld analysis is P1a1, lattice constants are a=5.0995 Å, b=8.7980 Å, c=9.4910 Å, and β angle=90.60°. It is found that the crystal structure has broken inversion symmetry. The σ-form iron oxide has a spontaneous electric polarization in the crystal a-axis and c-axis directions, from a result of first-principles calculation performed to the σ-form iron oxide of the present invention. Further, it is confirmed that the σ-form iron oxide exhibits ferromagnetism at a room temperature from a result of a magnetic measurement using SQUID (superconducting quantum interference device for magnetism detection) of MPMS7 produced by Quantum Design Co., and therefore the σ-form iron oxide has a magnetic polarization, and an angle formed with respect to the spontaneous electric polarization takes a value between 0° and 90°.

A unit cell of the crystal structure of the σ-form iron oxide is composed of sixteen iron atoms and twenty-four oxygen atoms, and they are divided into non-equivalent eight kinds of iron sites (Fe1 to Fe8), and twelve kinds of oxygen sites (O1 to O12).

Here, in the crystal structure shown in FIG. 3, atoms other than an asymmetric unit is indicated by a faint shadow.

Figure 4:
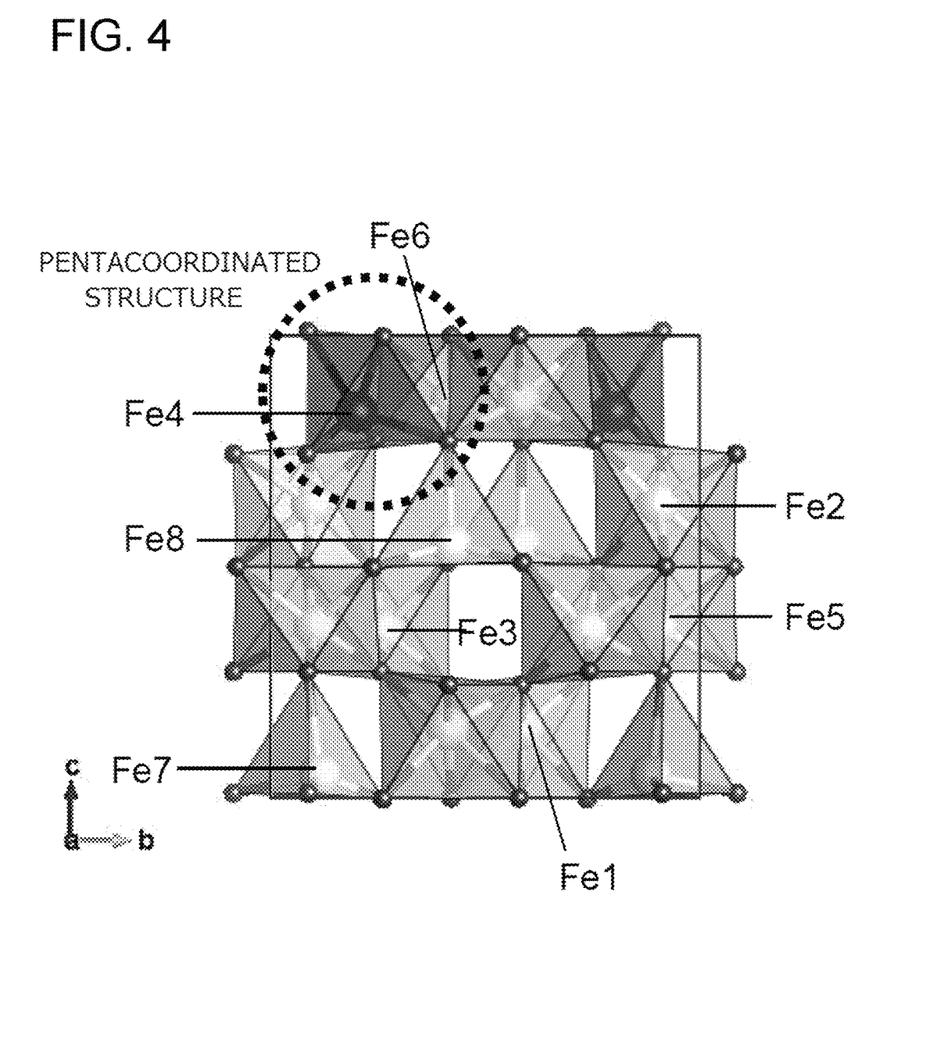
FIG. 4 shows a Fe-site indicated by polyhedra in the a-axis projection view of the crystal structure of the σ-form iron oxide.

FIG. 4 shows Fe1 to Fe3 sites, and Fe5 to Fe6 sites indicated by gray polyhedra, and a Fe4 site indicated by dark gray polyhedra (which is shown by surrounding it by a broken line), and Fe7 and Fe8 sites indicated by gray polyhedra, in an a-axis projection view of the crystal structure of the σ-form iron oxide according to the present invention.

Figure 5:
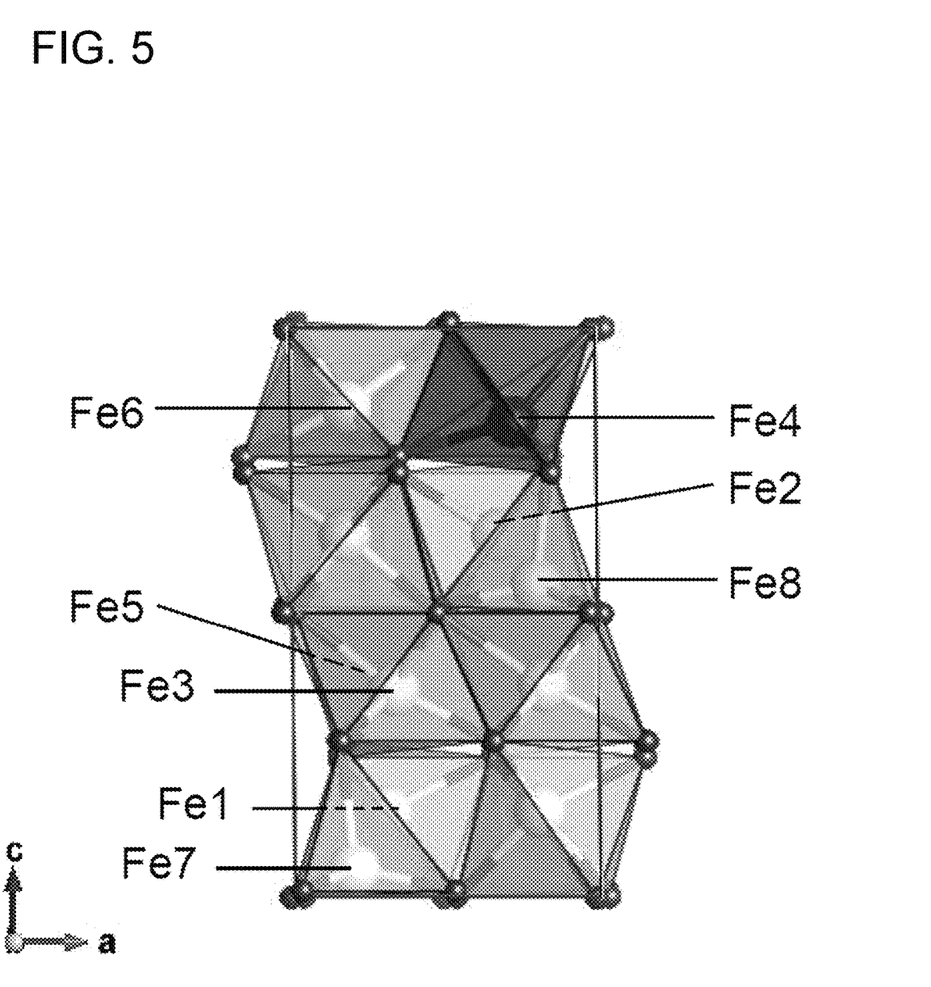
FIG. 5 shows a Fe-site indicated by polyhedra in a b-axis projection view of the crystal structure of the σ-form iron oxide.
Figure 6:
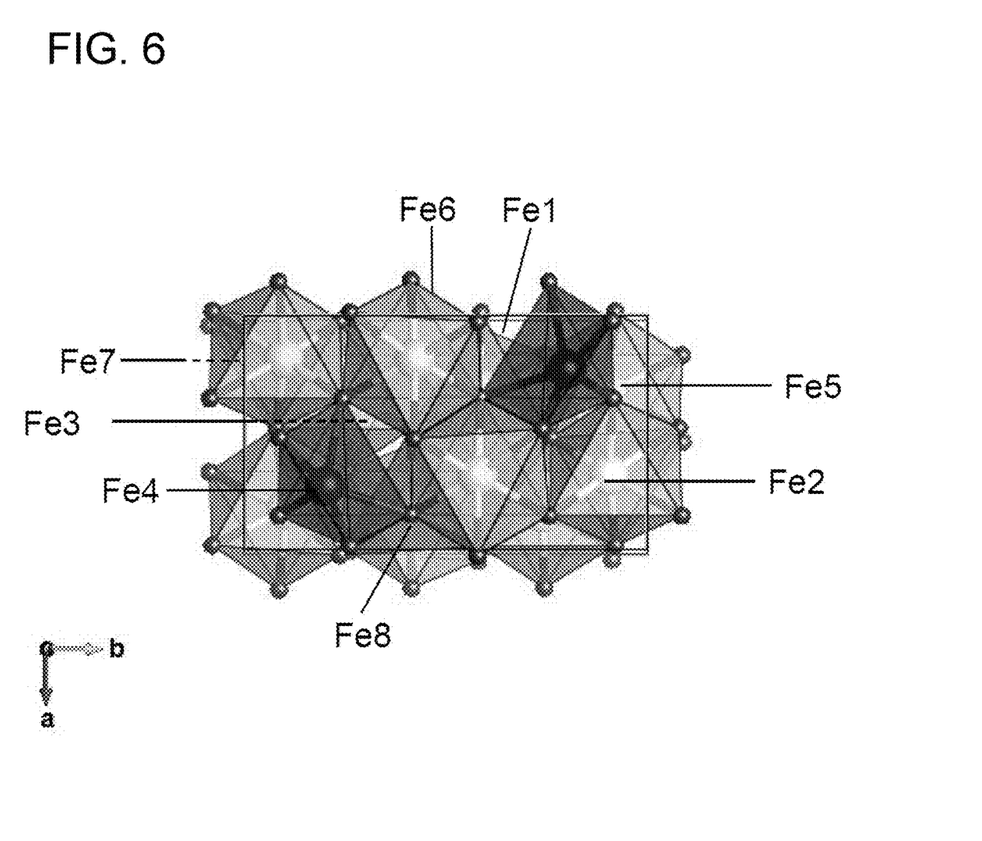
FIG. 6 shows a Fe-site indicated by polyhedra in a c-axis projection view of the crystal structure of the σ-form iron oxide.

FIG. 5 and FIG. 6 show the crystal structure of the σ-form iron oxide of the present invention indicated by a shadow similarly to FIG. 4, in a b-axis projection view and a c-axis projection view.

Then, in FIG. 4 to FIG. 6, it is conceivable that the Fe1 to Fe3 and the Fe5 to Fe6 sites have six coordinated structures, and the Fe site has a pentacoordinated structure, and the Fe7 and Fe8 sites have a tetracoordinated structure.

Figure 11:
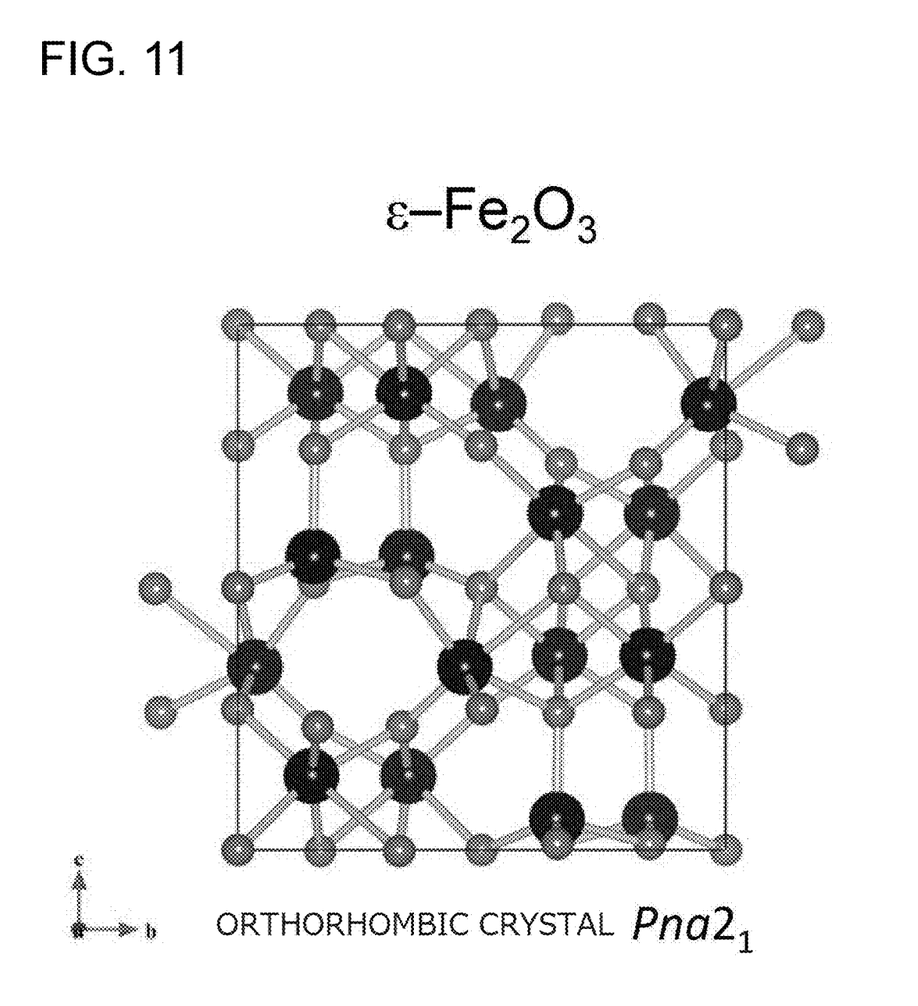
FIG. 11 is a schematic view showing a coordinated structure of a $\varepsilon$-$Fe_2O_3$ phase.
Figure 12:
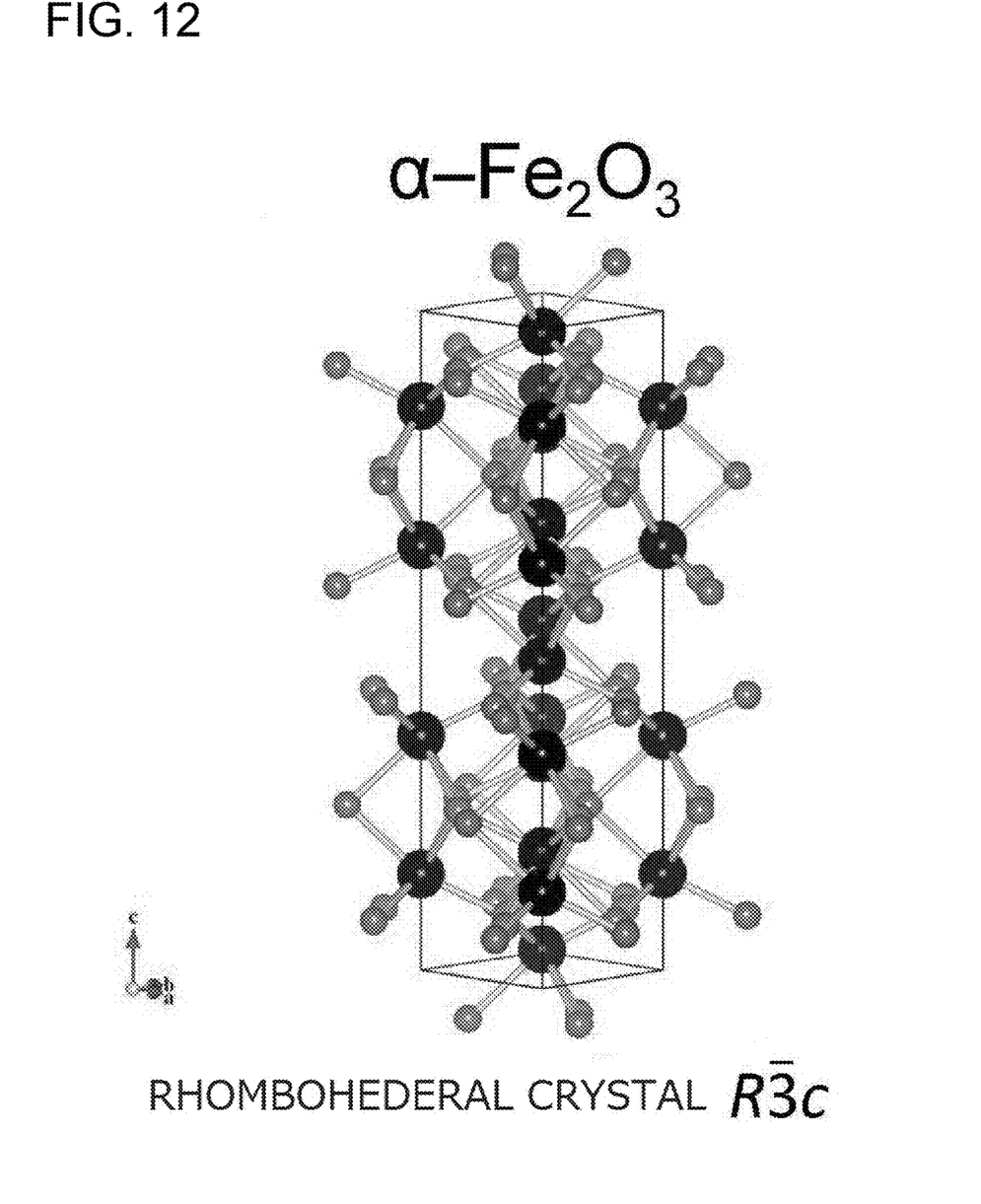
FIG. 12 is a schematic view showing a coordinated structure of a $\varepsilon$-$Fe_2O_3$ phase.
Figure 13:
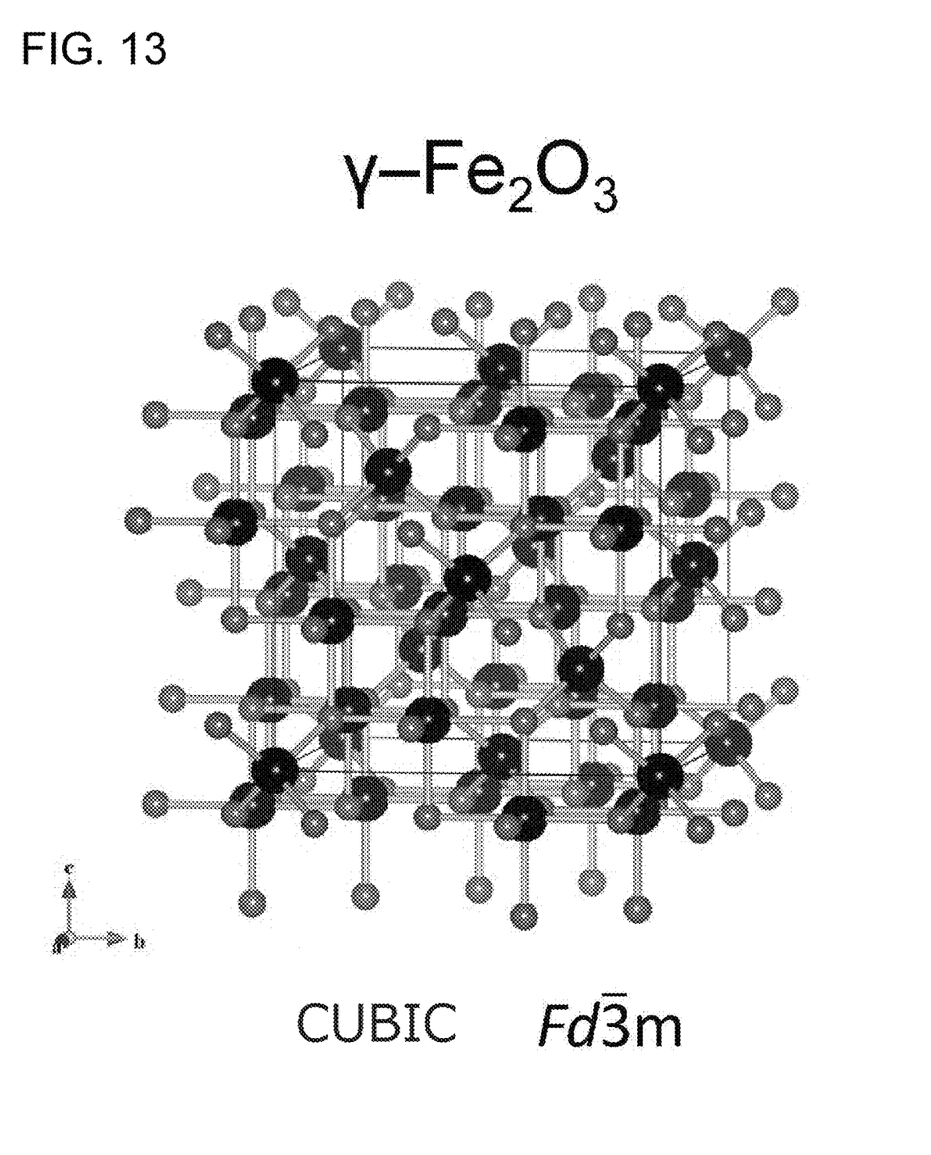
FIG. 13 is a schematic view showing a coordinated structure of a $\gamma$-$Fe_2O_3$ phase.

It should be noted that, for comparison, FIG. 11 is a crystal structure view of ε-form iron oxide having an orthorhombic crystal (space group $Pna2_1$) as the crystal structure, and FIG. 12 is a crystal structure view of the α-form iron oxide having a rhombohedral crystal (space group R-3c) as the crystal structure, and FIG. 13 is a crystal structure view of the γ-form iron oxide having a cubic crystal (space group Fd-3m) as the crystal structure.

Figure 7:
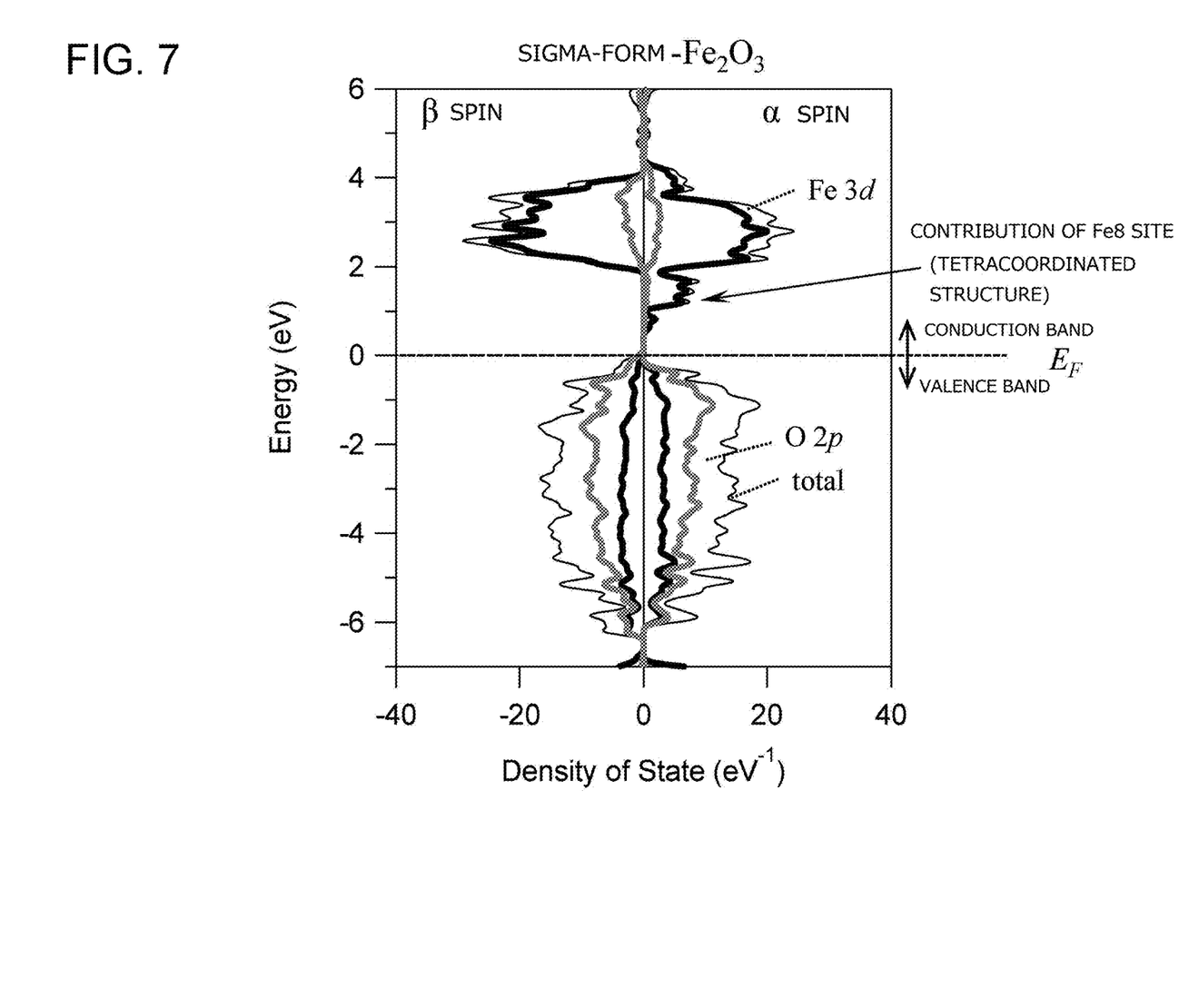
FIG. 7 shows an electronic density of states of the σ-form iron oxide.
Figure 8:
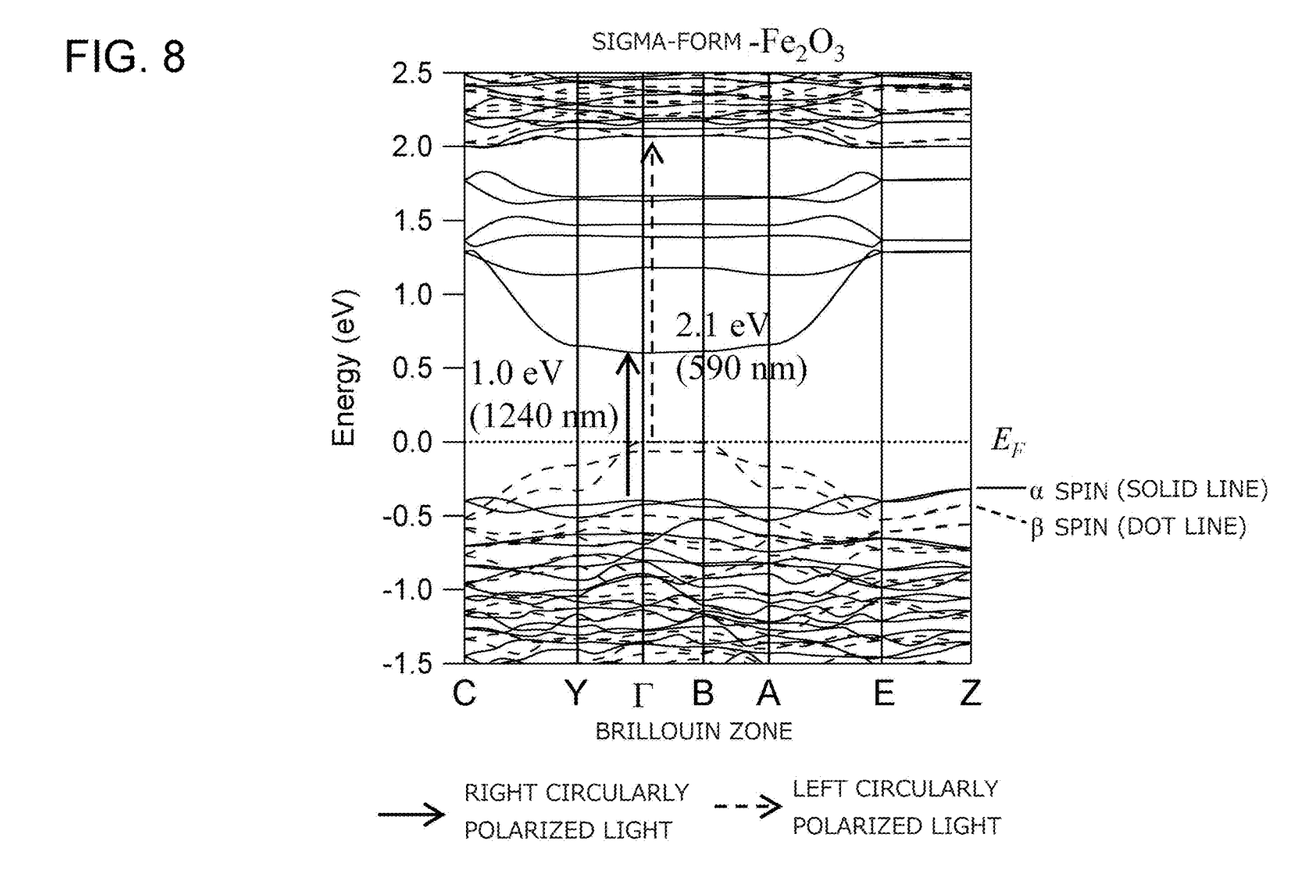
FIG. 8 shows a band dispersion of the σ-form iron oxide.

An electronic density of states shown in FIG. 7, and a band dispersion shown in FIG. 8, are obtained from the result of the first-principles calculation performed to the σ-form iron oxide (monoclinic crystal structure, space group P1a1) of the present invention. For comparison, FIG. 9 shows the electronic density of states of the ε-form iron oxide (orthorhombic crystal structure, space group $Pna2_1$), and FIG. 10 shows the band dispersion thereof.

Figure 9:
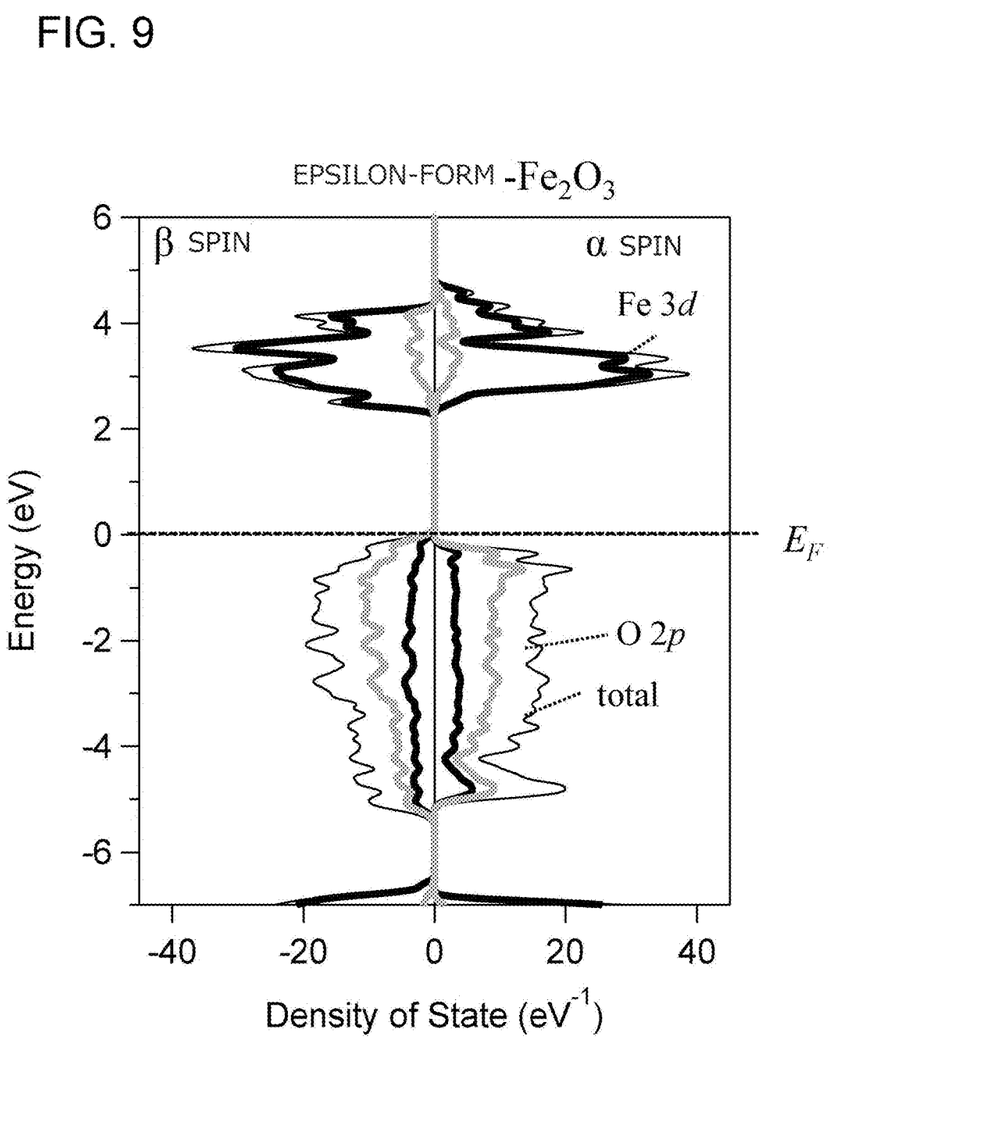
FIG. 9 shows an electronic density of states of the ε-form iron oxide.
Figure 10:
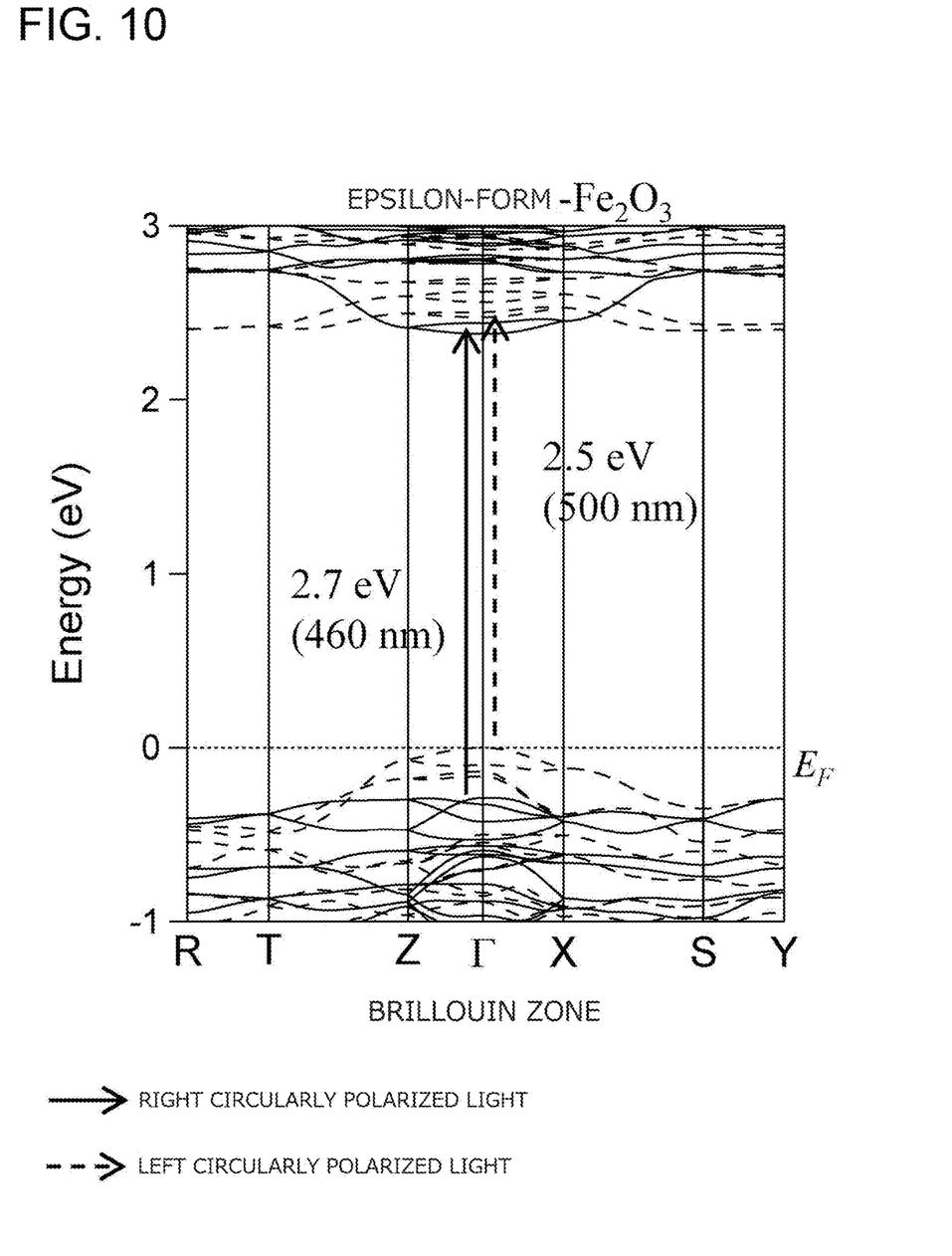
FIG. 10 shows a band dispersion of the ε-form iron oxide.

The electronic density of states view shown in FIG. 7 and FIG. 9 shows a graph in which the horizontal axis indicates an electronic density of states, and the vertical axis indicates energy.

The broken line at a position of energy 0 eV indicates a Fermi-level, and there is a valence band mainly composed of an oxygen 2p orbital (O2p) in a part lower than the Fermi level, and there is a conduction band mainly composed of an iron 3d orbital (Fe3d) in an upper part thereof. Then, the right side shows α spin, and the left side shows β spin in the electronic density of states.

Here, in FIG. 7 and FIG. 9, the spin of the oxygen 2p orbital is indicated by a gray thick solid line, and the spin of the iron 3d orbital is indicated by a black thick solid line, and a total value of the spin of the oxygen 2p orbital and the spin of the iron 3d orbital is indicated by a black thin solid line.

Then, it is found that in both of the σ-form iron oxide and the ε-form iron oxide, as described above, there is the band mainly composed of the oxygen 2p orbital (O2p) in the valence band, and there is the band mainly composed of the iron 3d orbital (Fe3d) in the conduction band.

However, in the σ-form iron oxide shown in FIG. 7, there is the band composed of the iron 3d orbital (Fe3d) at a low energy side of the band mainly composed of the σ-form iron oxide, in an α spin region of the conduction band. Then, it is found that the band is derived from the Fe8 site having the tetracoordinated structure adjacent to the abovementioned Fe4 site having the pentacoordinated structure, and it is considered that the electronic state of the Fe8 site having the tetracoordinated structure, is affected by the Fe4 site having the pentacoordinated structure.

On the other hand, in the ε-form iron oxide shown in FIG. 9, such a band is not observed.

The band dispersion near the Fermi level shown in FIG. 8 and FIG. 10, are graphs in which the horizontal axis indicates a Brillouin zone, and the vertical axis indicates energy. The broken line at a position of the energy 0 eV indicates the Fermi level.

In the band dispersion, α spin is indicated by a thin solid line, and β spin is indicated by a thin dot line.

Then, a transition with a smallest energy in a direct transition (an electron transition excited by a right circularly polarized light, namely, only the right circularly polarized light is absorbed) of the α spin to the conduction band from the α spin of the valence band, is indicated by a solid line arrow, and a transition with a smallest energy in a direct transition (an electron transition excited by a left circularly polarized light, namely, only the left circularly polarized light is absorbed) of the β spin to the conduction band from the β spin of the valence band, is indicated by a broken line arrow.

In the σ-form iron oxide shown in FIG. 8, a band gap from the α spin to the α spin is 1.0 eV (1240 nm) and small, and in contrast, a band gap from the β spin to the β spin is 2.1 eV (590 nm) and large, and it is conceivable that the σ-form iron oxide has an electronic structure similar to that of the half-metal. Accordingly, the σ-form iron oxide of the present invention is considered to exhibit a performance as the half-metal.

As a result, it is conceivable that only one of the right and left circularly polarized excitations, is enabled by the σ-form iron oxide of the present invention, in a range from the visible region to the near infrared region. Specifically, it is found that an energy difference between the right and left circularly polarized lights is 0.5 eV or more, and a lower energy value of the right and left circularly polarized energies is 1.5 eV or less.

Then, for example, it is expected that an optical isolator performance is exhibited, for example, for a light with a wavelength in the vicinity of 1.24 μm where a transition probability is great.

It is also conceivable that a material having a new property such as a high magnetization and high coercivity and having a property of the half-metal, can be found by combining the σ-form iron oxide which is a pyroelectric magnetic material and having the property of the half-metal, and a magnetic material having a different property like a high magnetization soft magnetic material, thereby producing a composite magnet or a core-shell magnet.

In contrast, the ε-form iron oxide shown in FIG. 10 has an electronic structure of a normal charge-transfer form insulator. Then, the band gap from the α spin to the α spin is 2.7 eV (460 nm), and the band gap from the β spin to the β spin is 2.5 eV (500 nm), and there is almost no difference between them.

(A Method for Producing the Magnetic σ-Form Iron Oxide Nanopowder)

Figure 1:
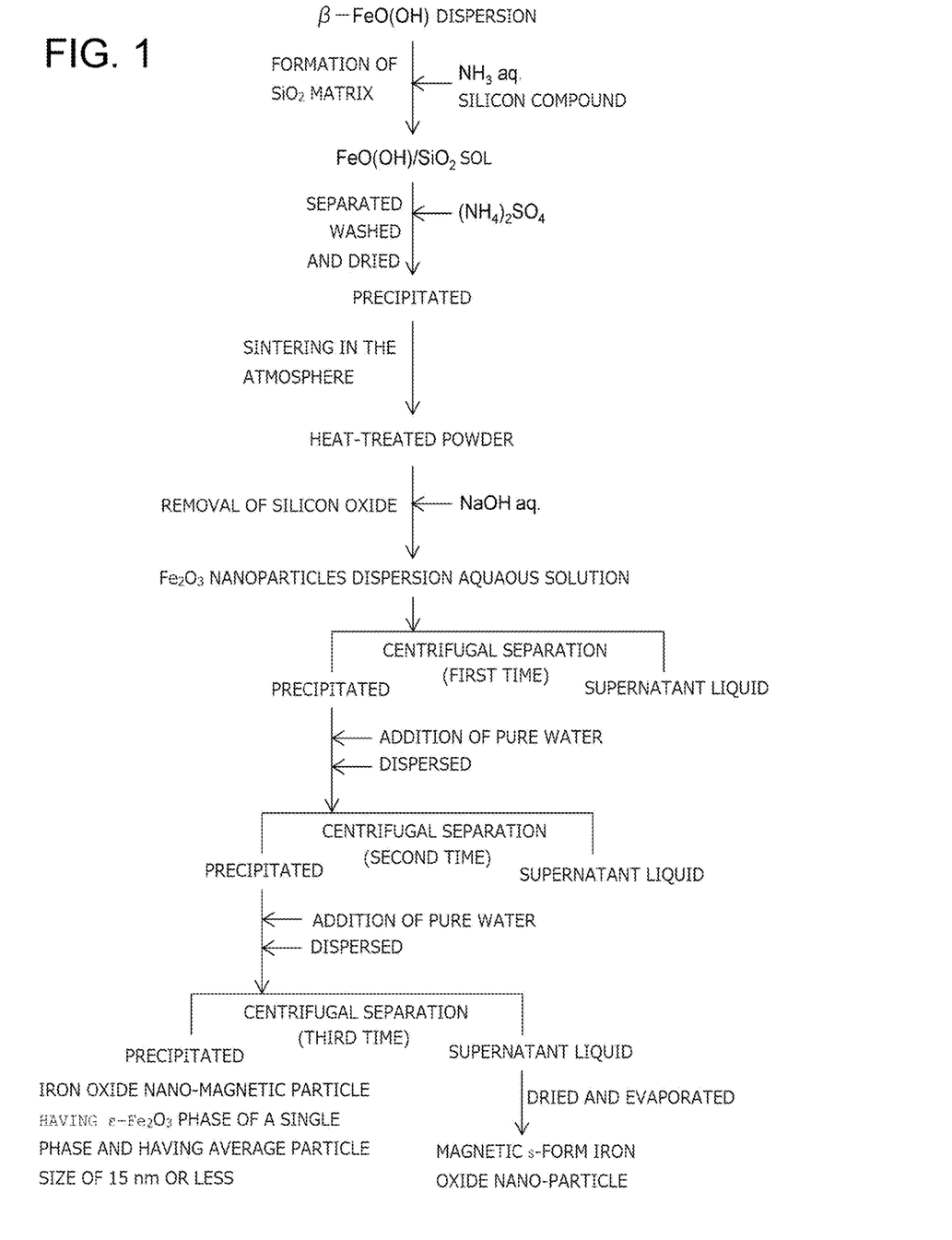
FIG. 1 is a flow chart of the steps of a method for producing magnetic σ-form iron oxide nanopowder.

Here, an example of the method for producing the magnetic iron oxide nanopowder, will be described, with reference to FIG. 1, which is a flowchart of the steps of a method for producing the magnetic iron oxide nanopowder according to the present invention.

By mixing β-FeO(OH) nanoparticles (iron oxide hydroxide (III)) having an average particle size of 15 nm or less, and pure water, to thereby prepare a dispersion in which a conversion concentration of iron (Fe) is 0.01 mol/L or more, and 1 mol/L or less.

3 to 30 moles of ammonia per 1 mol of the iron oxide hydroxide (III) is added to the dispersion by dropwise of aqueous ammonia, and the mixture is stirred at 0 to 100° C., and preferably at 20 to 60° C.

Further, 0.5 to 15 mols of a silicon compound per 1 mol of the β-FeO(OH) nanoparticles, is added by dropwise to the dispersion in which the ammonia is added, and the mixture is stirred for 15 hours or more and 30 hours or less, and thereafter is allowed to be cooled to a room temperature.

1 to 30 moles of ammonium sulfate per 1 mole of the β-FeO(OH) nanoparticles is added to the cooled dispersion, so that a precipitate is separated.

The separated precipitate is collected and washed by pure water, and thereafter dried at about 60° C. Further, the dried precipitate is pulverized to obtain a pulverized powder.

Heat treatment of 900° C. or more, less than 1200° C., preferably 950° C. or more, and 1150° C. or less is applied to the pulverized powder for 0.5 to 10 hours, and preferably 2 to 5 hours in an oxidizing atmosphere, to thereby obtain a heat-treated powder. Use of the air is allowed as the oxidizing atmosphere, and use of the air is preferable from a viewpoint of workability and a cost.

The obtained heat-treated powder is subjected to a deagglomeration treatment, and thereafter is added into a sodium hydroxide aqueous solution (NaOH) as a strong alkaline solution with a liquid temperature of 60° C. or more and 70° C. or less, and the mixture is stirred for 15 hours or more and 30 hours or less, and preferably 20 hours or more and 26 hours or less so that silicon oxide is removed from the heat-treated powder, to thereby generate an aqueous dispersion of iron oxide magnetic nanoparticles.

Subsequently, the generated aqueous dispersion of the iron oxide nano-magnetic particles is subjected to a centrifugal separation operation (first time), to be separated into the precipitate and a supernatant liquid. Then, the precipitate (first time) is collected, and pure water is added thereto so that the precipitate is dispersed therein and thereafter the centrifugal separation operation (second time) is performed again, to thereby collect a precipitate (second time). Further, if desired, pure water is added to the precipitate (second time) so that the precipitate is dispersed therein, and thereafter the centrifugal separation operation (third time) is performed again. Namely, the centrifugal separation is repeated twice or more and preferably three times or more. At this time, the number of rotation of the centrifugal separation is preferably set to 5,000 rpm or more and 15,000 rpm or less.

Then, the supernatant liquid obtained by the final centrifugal separation is dried and evaporated, to thereby obtain the magnetic σ-form iron oxide nanopowder of the present invention.

On the other hand, the magnetic iron oxide nanopowder with an average particle size of 15 nm or less can be obtained from the precipitate obtained by the final centrifugal separation operation, as the magnetic ε-form iron oxide nanopowder.

(Conclusion)

According to the present invention, the magnetic σ-form iron oxide nanopowder can be easily synthesized.

In addition, the magnetic σ-form iron oxide nanopowder of the present invention is expected in an industrial application for the purpose of various purposes of use, from a viewpoint of easiness of a synthesis method or a safety and a stability of the material.

EXAMPLE

The present invention will be described hereafter, with reference to examples.

Example 1

(Procedure 1) Pure water 420 mL and a sol 8.0 g of the β-FeO(OH) nanoparticles (iron oxide hydroxide (III)) having an average particle size of 6 nm, were put in 1 L Erlenmeyer flask, and the mixture was stirred until it was turned into a homogeneous dispersion.

25% aqueous ammonia solution 19.2 mL was added thereto by dropwise, and the mixture was stirred at 50° C. for 30 minutes. Further, tetraethoxysilane (TEOS) 24 mL was dropped to the dispersion as a silicon compound, and the mixture was stirred at 50° C. for 20 hours, and thereafter allowed to be cooled to a room temperature. When the dispersion was cooled to the room temperature, ammonium sulfate 20 g was added thereto, and a precipitate was separated.

(Procedure 2)

The separated precipitate was collected by centrifugation. The collected precipitate was washed by pure water, and transferred to a petri dish and dried in a drier at 60° C., and thereafter pulverized in an agate mortar, to thereby obtain a pulverized powder.

(Procedure 3)

The pulverized powder was put in a furnace, and a heat treatment was applied thereto in the atmosphere, at 1061° C., for 4 hours. The obtained heat-treated powder was deagglomerated in the agate mortar, and thereafter stirred at a liquid temperature of 65° C., for 24 hours in a 5 mols/L sodium hydroxide (NaOH) aqueous solution so that silicon oxide was removed from the heat-treated powder, to thereby obtain a dispersion aqueous solution of $Fe_2O_3$ nanoparticles.

(Procedure 4)

The centrifugal separation operation (first time) was performed to the generated dispersion aqueous solution of $Fe_2O_3$ nanoparticles at 5,000 rpm (rpm: rotation per minute) for 10 minutes, to thereby separate the precipitate and a supernatant liquid. Next, pure water was added to the precipitate (first time) so that the precipitate was dispersed therein, and thereafter the centrifugal separation operation (second time) was performed thereto at 10,000 rpm for 5 minutes, to thereby separate the precipitate and the supernatant liquid. Further, pure water was added to the precipitate (second time) so that the precipitate was dispersed therein, and the centrifugal separation operation (third time) was performed thereto at 14,000 rpm for 60 minutes, to thereby separate the precipitate and the supernatant liquid. Then, the supernatant liquid (third time) was dried and evaporated, to thereby obtain the magnetic σ-form iron oxide nanopowder of the present invention included in the supernatant liquid (third time).

FIG. 2 shows data of the obtained magnetic σ-form iron oxide nanopowder, obtained by X-ray diffraction measurement (XRD) and Rietveld analysis.

Further, FIG. 3 is an a-axis projection view of the crystal structure of the σ-form iron oxide obtained by the result of the Rietveld analysis.

Further, FIG. 7 shows electronic density of states obtained by the result of a first-principles calculation, and FIG. 8 shows a band dispersion.

The invention claimed is:

1. A magnetic powder having a composition is $Fe_2O_3$, and a Fe coordination site of a pentacoordinated structure in a crystal structure.

2. The magnetic powder according to claim 1, wherein the magnetic powder includes a magnetic polarization and a spontaneous electric polarization at a room temperature, and an angle formed by the magnetic polarization with respect to the spontaneous electric polarization takes a value between 0° and 90°.

3. The magnetic powder according to claim 1, wherein only circularly polarized excitation of one side of right and left circularly polarized excitations can be enabled in a near infrared region from a visible region.

4. The magnetic powder according to claim 1, wherein an energy difference between right and left circularly polarized lights is 0.5 eV or more, and a lower energy value of the right and left circularly polarized energies is 1.5 eV or less.

5. The magnetic powder according to claim 1, wherein the crystal structure belongs to a monoclinic system.

6. A method for producing the magnetic powder according to claim 1, to obtain magnetic σ-form iron oxide nanopowder by using β-FeO(OH) (iron oxide hydroxide (III)) nano-particle dispersion, and by covering the β-FeO(OH) nano-particle with silicon oxide, and thereafter applying heat treatment in an oxidizing atmosphere, and applying centrifugation thereto, and drying and evaporating a supernatant liquid.

7. The magnetic powder according to claim 1, wherein the crystal structure belongs to a simple lattice (P) of a monoclinic system.

8. A composite magnet comprising the magnetic powder according to claim 1.

9. A core-shell magnet comprising the magnetic powder according to claim 1.

* * * * *